US006608292B1

(12) United States Patent  (10) Patent No.: US 6,608,292 B1
Barnes  (45) Date of Patent: Aug. 19, 2003

(54) MICROWAVE GRILLING APPLIANCE

(76) Inventor: Neal Patrick Barnes, 6246 Zealand Ave. N., Brooklyn Park, MN (US) 55428

( * ) Notice: Subject to any disclaimer, the term of this patent is extended or adjusted under 35 U.S.C. 154(b) by 0 days.

(21) Appl. No.: 10/205,949

(22) Filed: Jul. 26, 2002

(51) Int. Cl.[7] .................................................. H05B 6/80
(52) U.S. Cl. ........................ 219/730; 219/732; 99/425; 99/445; 99/DIG. 14
(58) Field of Search ................................. 219/730, 725, 219/731, 732, 733, 734, 735, 762, 259; 99/DIG. 14, 422, 424, 425, 445, 450; 426/241, 243

(56) References Cited

U.S. PATENT DOCUMENTS

| 3,591,751 A | 7/1971 | Goltsos |
| 3,845,266 A | 10/1974 | Derby |
| 3,857,009 A | 12/1974 | MacMaster et al. |
| 3,941,968 A | 3/1976 | MacMaster et al. |
| 3,949,184 A | 4/1976 | Freedman |
| 4,362,917 A | 12/1982 | Freedman et al. |
| 4,398,077 A * | 8/1983 | Freedman et al. .......... 219/732 |
| 4,454,403 A | 6/1984 | Teich et al. |
| 4,862,791 A * | 9/1989 | Baughey ..................... 99/400 |
| 4,906,806 A | 3/1990 | Levinson |
| 4,948,932 A | 8/1990 | Clough |
| 5,322,984 A | 6/1994 | Habeger, Jr. et al. |
| 5,736,718 A | 4/1998 | Levinson |
| 5,935,477 A | 8/1999 | Koochaki |
| 6,229,131 B1 | 5/2001 | Koochaki |

* cited by examiner

Primary Examiner—Philip H. Leung
(74) Attorney, Agent, or Firm—Patton Boggs LLP

(57) ABSTRACT

A microwave grilling appliance comprising grill elements that include heat conducting elements and microwave absorbent material. Troughs are formed in the periphery of the grill elements to contain the liquids produced from grilling a grillable food. A microwave transparent cover and base support the grill elements and provide a void space between the microwave transparent cover and base and the respective grill element. A lip and seal provide a liquid-tight seal between the grill elements and the supporting microwave transparent cover and base. The seal prevents liquids from grilling or washing from entering behind the grill elements. A hinge assembly provides multiple stop positions for the microwave transparent cover relative to the microwave transparent base.

18 Claims, 8 Drawing Sheets

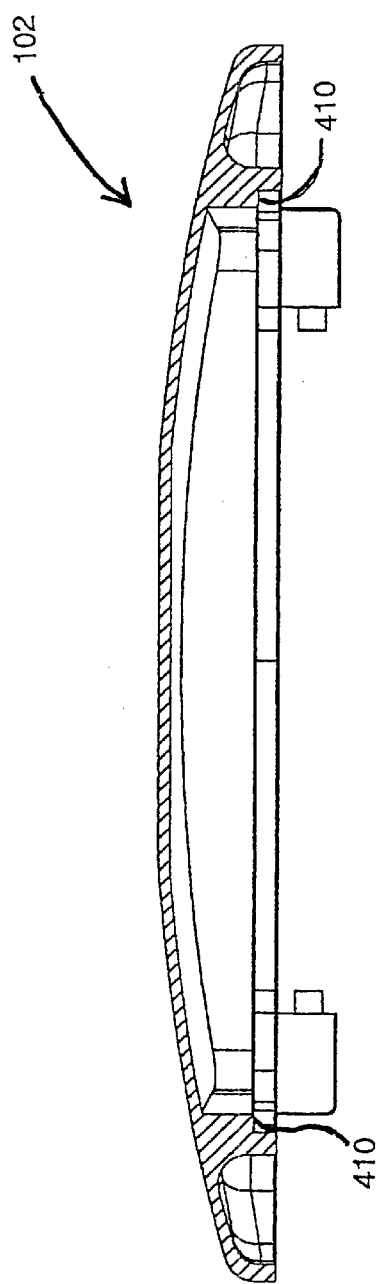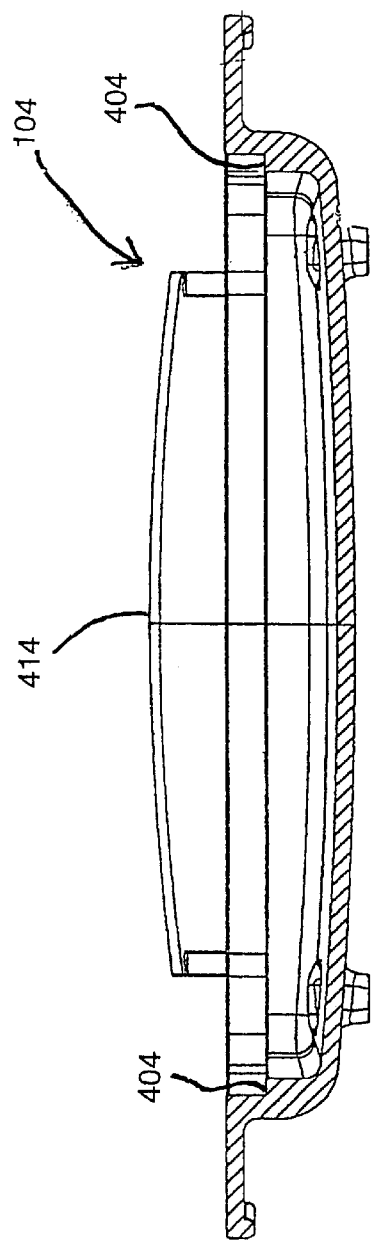
FIG. 4A
FIG. 4B

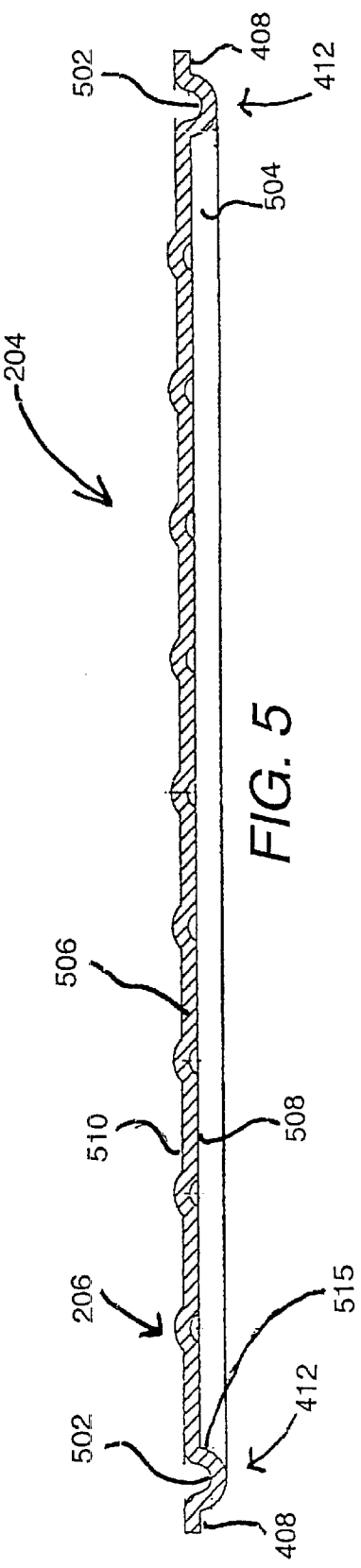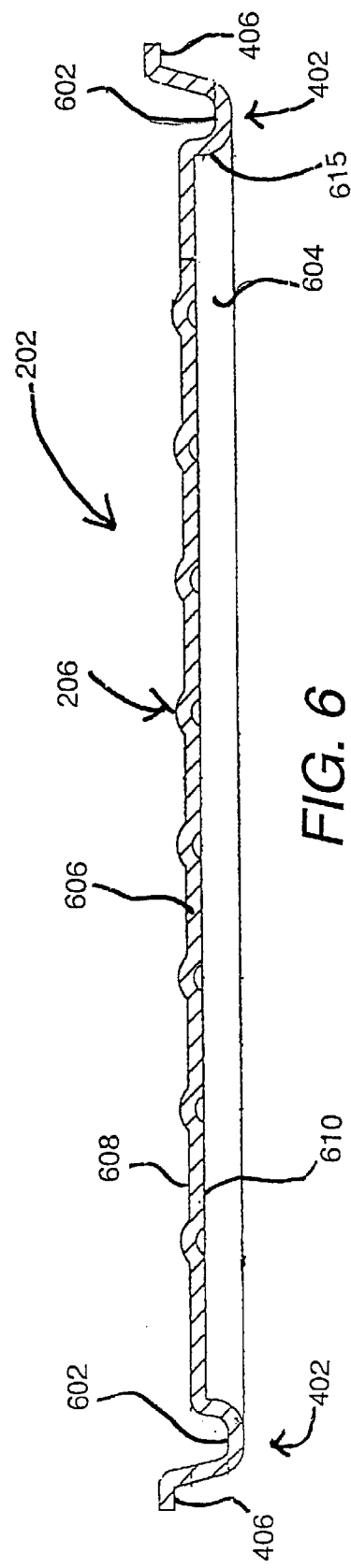

MICROWAVE GRILLING APPLIANCE

BACKGROUND OF THE INVENTION

1. Field of the Invention

The invention in general relates to appliances that operate by changing microwave energy to heat energy and conducting the heat to food by contact, and more particularly to such appliances that can be used to grill foods.

2. Statement of the Problem

Appliances that heat grillable food or other grillable substances by causing microwave energy to be absorbed by an intermediate body, such as a block of ferrite, which in turn transfers heat to the grillable food, which we shall refer to herein as microwave grills, have been known for more than twenty years. These appliances inherently require no ventilation of burned fuels and thus can be used in a small kitchen, use a ready source of energy, and are very fast as compared to conventional grills. Yet a commercially successful microwave grill has never been produced. The reason is that prior art microwave grills have never reached the degree of reliability and ease of use expected for kitchen appliances, particularly in the upscale homes and businesses that would tend to use such grills.

U.S. Pat. No. 4,362,917 issued Dec. 7, 1982 to Freedman and Bowen describe a block of ferrite binded to a microwave transparent cover. U.S. Pat. No. 4,454,403 issued Jun. 12, 1984 to Teich and Dudley describes a silicone material having ferrite material dispersed within the silicone binded to a microwave transparent cover. The ferrite material in these references continuously contacts the microwave transparent cover and transfers heat across the whole of the microwave transparent cover making the microwave transparent cover uncomfortable to the touch of a user. In addition, these designs do not include a suitable means for handling grease and other liquids that are generated in the grilling process. U.S. Pat. No. 5,736,718 issued Apr. 7, 1998 to Levinson describes a vertical microwave grilling apparatus with a separate collection container. This arrangement requires alignment between the grilling apparatus and the collection container and is really too messy to appeal to the average upscale griller. All known prior art microwave grill designs that had separate grills and grill housings also allowed grease, water and other liquids to get into the areas between the grills and housings. At the same time, the prior art designs did not consider the fact that the appliances were likely to be washed in a dishwasher, and allowed water to seep between the outside cover and base and the grill elements. Prior art grills are generally not capable of being submerged in water, which expedites the cleaning process. Further, prior art designs had unwieldy hinges that did not account for differing user preferences and needs and further contributed to messiness by not permitting easy separation of the cover and base. Thus, it is evident that if the advantageous properties inherent in microwave grills are to be enjoyed by the public, a significant advance in such grills is required.

SUMMARY OF THE INVENTION

The present invention advances the art and helps to overcome the aforementioned problems by providing a microwave grilling appliance that includes all the inherent advantages of a microwave griller and at the same time is easy to use and does not result in undesirable messiness.

The microwave grill according to the invention provides a base grill element and base that are thermally isolated. The microwave griller according to the invention provides a liquid-tight seal between the grill element and base. Similarly, the microwave grill according to the invention includes a cover grill element and cover that are thermally isolated. The microwave grill according to the invention also includes a liquid-tight seal between the cover grill element and the cover. The microwave grill according to the invention includes a trough about the base grill element that effectively prevents grease and liquids generated in the grill process from overflowing the grill unit. The microwave grill according to the invention provides a hinge assembly that permits the cover to be held open in two different positions and to be easily removed from the base. Each of the above features is separately novel, and the novel combination of all the features results in a microwave griller that should be a welcome addition to an upscale kitchen The present invention provides an appliance for converting microwave energy to heat and applying the heat to a grillable food or other grillable substance, the appliance comprising: a first grill element including a microwave absorbent material and a heat conducting element, the heat conducting element having a first surface in contact with the microwave absorbent material and a second surface adapted to contact said grillable food or other grillable substance, a microwave transparent base adapted to support the grill element with the absorbent material spaced from the base, the base and heat conducting element enclosing the absorbent element, and a liquid-tight seal between the grill element and the base. Preferably, the seal comprises an epoxy glue. Preferably, the epoxy is a flexible epoxy. Preferably, the epoxy is a silicon-based epoxy. Preferably, the seal further comprises a first lip on the heat conducting element and a second lip on the base, the first and second lips overlapping, and wherein the epoxy glue is located between the lips.

Preferably, the first lip is spaced from the microwave absorbent material. Preferably, the heat conducting element includes a first trough between the first lip and the second surface, the first trough having sufficient capacity to effectively prevent grease and liquids generated in the grill process from overflowing the grill unit. Preferably, the first trough has a capacity of between 20 milliliters (mls) and 50 mls. Preferably, the trough forms a rim about the first surface, and wherein the microwave absorbent material lies in the recess formed by the rim. Preferably, the appliance further comprises: a second grill element including a second microwave absorbent material and a second heat conducting element, the second heat conducting element having a third surface in contact with the microwave absorbent material and a fourth surface adapted to contact the grillable food or other grillable substance, a microwave transparent cover adapted to support the grill element, the cover and the second heat conducting element enclosing the second absorbent element, and a liquid-tight seal between the second grill element and the cover. Preferably, the second seal comprises a third lip on the second heat conducting element and a fourth lip on the cover, the third and fourth lips overlapping, and wherein epoxy glue is located between the third and fourth lips. Preferably, the third lip is spaced from the second microwave absorbent material. Preferably, the second heat conducting element includes a second trough between the third lip and the third surface, the second trough having sufficient capacity to effectively prevent grease and liquids generated in the grill process from overflowing the grill unit. Preferably, the second trough has a capacity of between 10 mls and 30 mls.

In another aspect, the invention provides an appliance for converting microwave energy to heat and applying the heat to a grillable food or other grillable substance, the appliance comprising: a first grill element including a first microwave absorbent material and a first heat conducting element, the first heat conducting element having a first surface in contact with the microwave absorbent material and a second surface adapted to contact the grillable food or other grillable substance, a microwave transparent base adapted to support the grill element, the base and first heat conducting element enclosing the first absorbent element, a second grill element including a second microwave absorbent material and a second heat conducting element, the second heat conducting element having a third surface in contact with the microwave absorbent material and a fourth surface adapted to contact the grillable food or other grillable substance, a microwave transparent cover adapted to support the grill element, the cover and the second heat conducting element enclosing the second absorbent element; and a hinge assembly adapted to: permit movement of the fourth surface relative to the second surface with the fourth and second surfaces remaining substantially parallel; permit rotational movement of the cover about said hinge; and to support the cover in first stop position located at a point corresponding to a rotation about the hinge of between 90 degrees and 180 degrees. Preferably, the hinge assembly is further adapted to permit the cover to lie flat on a flat surface at a second stop position located at a position corresponding substantially to a rotation about the hinge of 180 degrees.

The microwave grill according to the invention not only provides, for the first time, a microwave griller that achieves the degree of reliability and ease of use expected for kitchen appliances today, but also provides a simplicity of design that permits it to be constructed in modem, efficient assembly plants. Numerous other features, objects and advantages of the invention will become apparent from the following description when read in conjunction with the accompanying drawings.

BRIEF DESCRIPTION OF THE DRAWINGS

FIG. 4A is a cross-section view of the cover;

FIG. 4B is a cross-section view of the base;

FIG. 5 is an illustration of the cross-section of the second grill element;

FIG. 6 is an illustration of the cross-section of the first grill element;

DETAILED DESCRIPTION OF THE PREFERRED EMBODIMENT

The microwave grilling appliance provides a convenient, fast approach to grilling foods in minutes using a microwave oven. Food is grill seared from the outside in, similar to grilling on a regular outdoor grill; i.e., steaks are cooked on the outside and pink in the middle. Most foods that you can grill outdoors, broil in the oven, fry on the stove or cook in a Foreman grill, can be grilled quicker and easier in the microwave grilling appliance according to the invention. The microwave grilling appliance includes a heating technology that absorbs microwaves and converts them into high temperature heat (400° F. to 500° F.) that is conducted by the microwave grilling appliance's two grill elements which grill the food on the top and bottom simultaneously.

Figure 1:
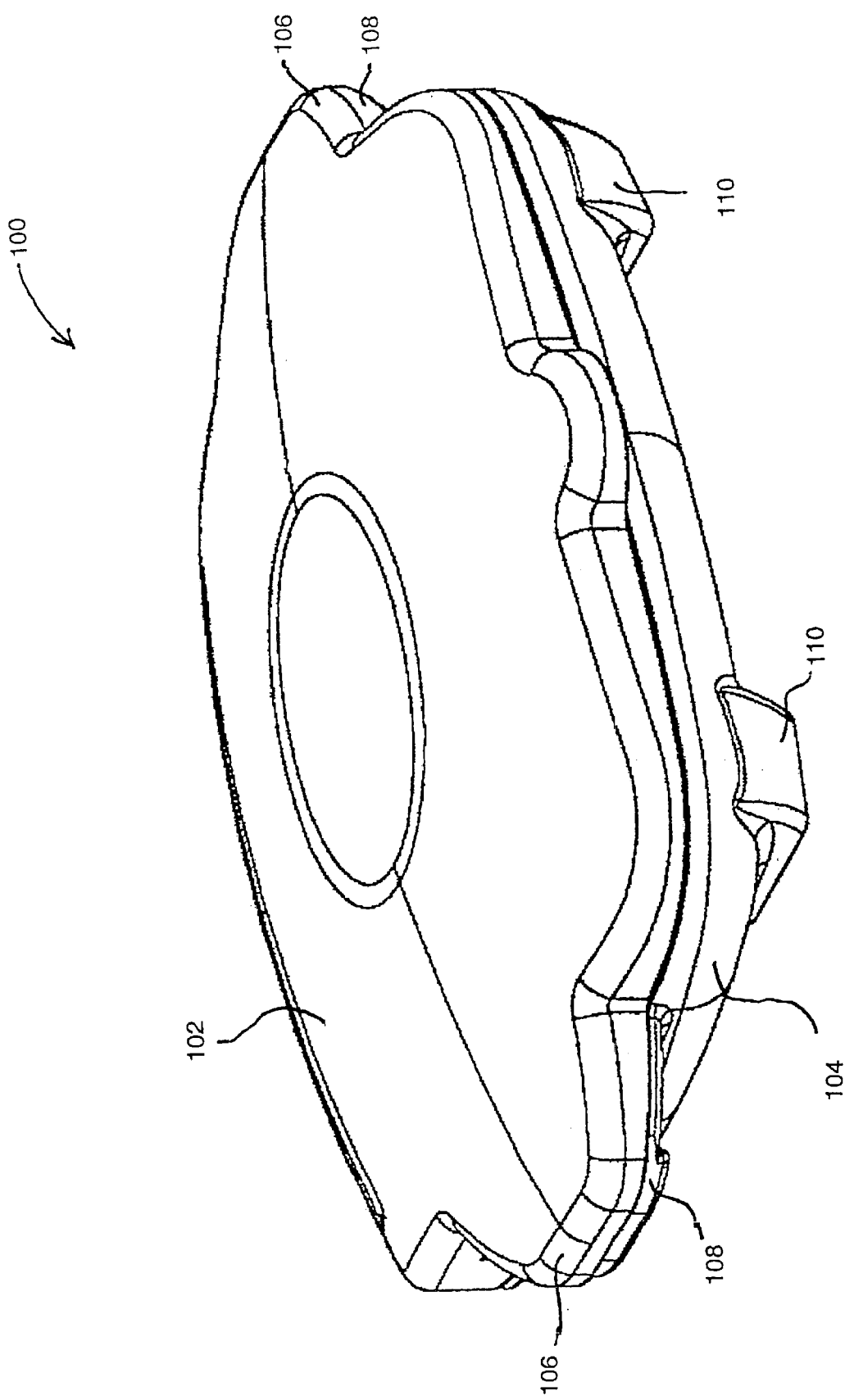
FIG. 1 is a perspective view of the microwave grilling appliance.
Figure 2:
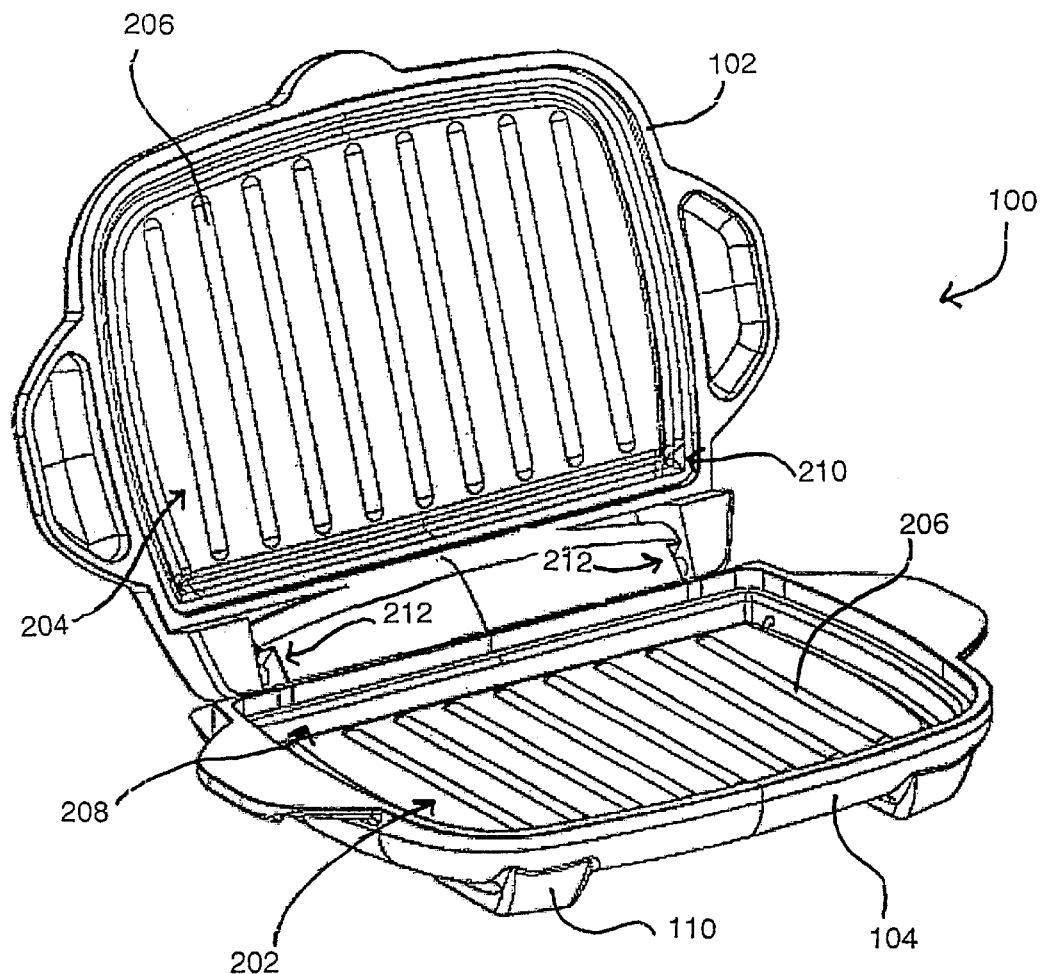
FIG. 2 is an illustration of the microwave grilling appliance with the microwave transparent cover at just past the 90 degree stop position.

Directing attention to FIGS. 1 and 2, the microwave grilling appliance 100 has a clam-shell design with a microwave transparent base 104, a microwave transparent cover 102 and a hinge assembly 212, that allows the microwave transparent cover 102 to close like a clam shell relative to the microwave transparent base 104. The microwave grilling appliance 100 requires no electricity by itself to operate. The microwave grilling appliance 100 is also dishwasher safe.

The microwave transparent base 104 includes four legs 110 (two shown) that support the microwave grilling appliance 100 slightly above a supporting surface (not shown), such as the microwave oven or countertop. The legs 110 separate the base from the horizontal supporting surface, like a counter top or table, and thus enable a user to set the microwave grilling appliance 100 on a counter top or fine table without injury to the counter top or table should the base itself become hot. The microwave transparent base 104 includes a microwave transparent base handle 108 on each side, and the microwave transparent cover 102 includes a microwave transparent cover handle 106 on each side to enable a user to hold the microwave grilling appliance 100. The microwave transparent base handles 108 and the microwave transparent cover handles 106 overlap each other when the microwave grilling appliance 100 is in the closed position, as shown in FIG. 1. The microwave transparent base 104 and cover 102 are made of a bulk molding compound with low microwave absorption rate, or attentively, other types of compounds with low microwave absorption rates. A bulk molding compound generally comprises a mixture of resin, inert fillers, reinforcements and other additives which forms a puttylike sheet, which hardens upon curing. Such a material, in addition to being transparent to microwaves, is a good insulator. Thus, the base and cover will resist becoming hot, as described in more detail below. Further, if the portion of the base and cover that touches the grilling elements does become hot, the legs 110 and handles 106, 108 will not become hot because of the low heat transfer rates in the material.

The opened position of the microwave transparent cover 102 in FIG. 2 depicts a first stop position, which is just past 90 degrees, of the microwave transparent cover 102 with respect to the microwave transparent base 104. The microwave transparent base 104 can be any color. In one aspect of the present invention, the color of the microwave transparent base 104 is red. The microwave transparent base 104 includes a slight hump back portion 414 which engages the microwave transparent cover 102 to define a stop position just past 90 degrees from horizontal. In one aspect of the present invention, the microwave transparent base 104 is approximately 11 inches in width.

The microwave transparent cover 102 includes a lip 410 for supporting the second grill element 204. The microwave transparent cover 102 can be any color. In one aspect of the present invention, the color of the microwave transparent cover 102 is red. In one aspect of the present invention, the microwave transparent cover 102 is approximately 11 inches in width. The microwave transparent cover 102 has a stop position just past 90 degrees from horizontal, in addition to the microwave transparent cover 102 being capable of rotating to 180 degrees relative to the microwave transparent base 104. The microwave transparent cover 102 also has a stop position in the closed position or cooking position.

To cook food, the microwave grilling appliance 100 is preheated in a microwave oven (not shown), then the food is placed in the microwave grilling appliance 100, the microwave transparent cover 102 is closed, and the microwave grilling appliance 100 is placed back in a microwave oven for a period of time. The microwave grilling appliance 100 grills foods such as steaks, hamburgers, bacon, poultry, fish, grilled sandwiches and breads.

The microwave grilling appliance 100 includes a first grill element 202. The first grill element 202 absorbs microwave energy and converts the microwave energy into thermal energy to grill the grillable food or other grillable substances. The first grill element 202 is disposed in and supported by the microwave transparent base 104. A second grill element 204 is disposed in and supported by the microwave transparent cover 102. The first grill element 202 and the second grill element 204 include ribs 206 to allow liquids generated by microwave grilling of the grillable foods to run into a trough, shown and described later in FIGS. 5 and 6. The microwave grilling appliance 100 includes a hinge assembly 212 located toward each side of the microwave grilling appliance 100. The microwave grilling appliance 100 includes a first liquid-tight seal 208 located around the perimeter of the first grill element 202 and a second liquid tight seal 210 located around the perimeter of the microwave transparent cover 102. The liquid-tight seals 208, 210 are a novel feature of the present invention, as they prevent liquids from seeping between the grill elements 202, 204 and the microwave transparent base 104 and microwave transparent cover 102. The liquids are generated from the grillable foods, or alternatively, other sources such as during clean-up procedures, such as dishwashing operations.

Figure 4:
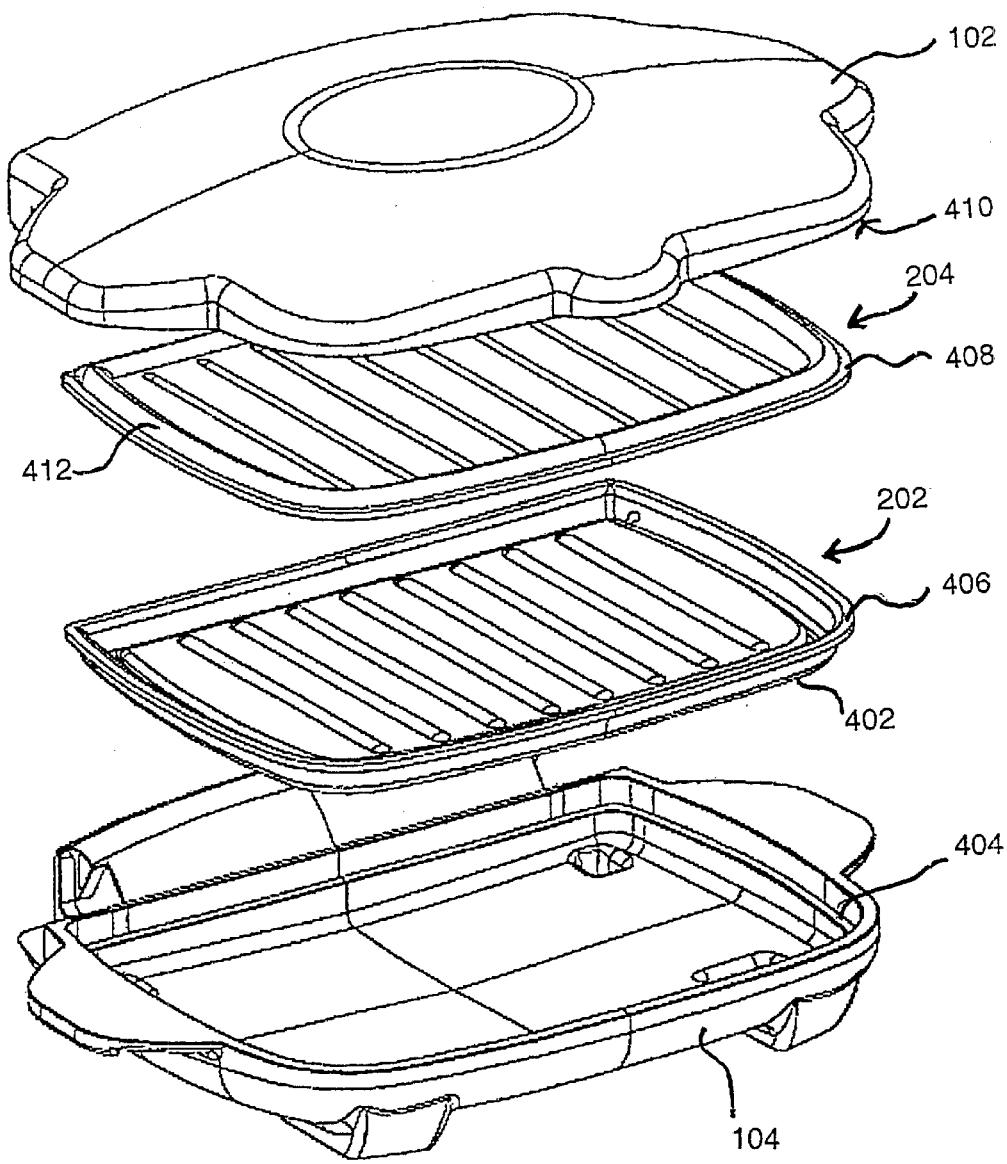
FIG. 4 is an exploded view of the cover, second grill element, first grill element and base of the microwave grilling appliance.

Turning to FIGS. 4, 4A and 4B, the first liquid-tight seal 208 includes a first lip 406 that is located on the first heat conducting element 606 supported by the microwave transparent base 104, and a second lip 404 that is located on the microwave transparent base 104. A heat resistant adhesive material, such as epoxy glue, is placed between the first lip 406 and the second lip 404. The epoxy glue, or alternatively, other epoxy compounds such as flexible epoxy, silicon-based epoxy or epoxy resin, are resistant to breakdown due to the high grilling temperatures. Lips 406 and 404 overlap each other. The second liquid-tight seal 210 includes a third lip 408 that is located on the second heat conducting element 506 supported by the microwave transparent cover 102, and a fourth lip 410 that is located on the microwave transparent cover 102. A heat resistant material, such as epoxy glue, is placed between the third lip 410 and the fourth lip 408. Lips 410 and 408 overlap each other. The invention contemplates that other seals than those described above may be used. For example, an o-ring and fasteners may be used instead of the glue. A tight frictional fit with close specifications in which the grill element is forced into the tight fit may also be used. Structures other than the lip structures, such as a tongue and groove structure, may also be used.

Figure 3:
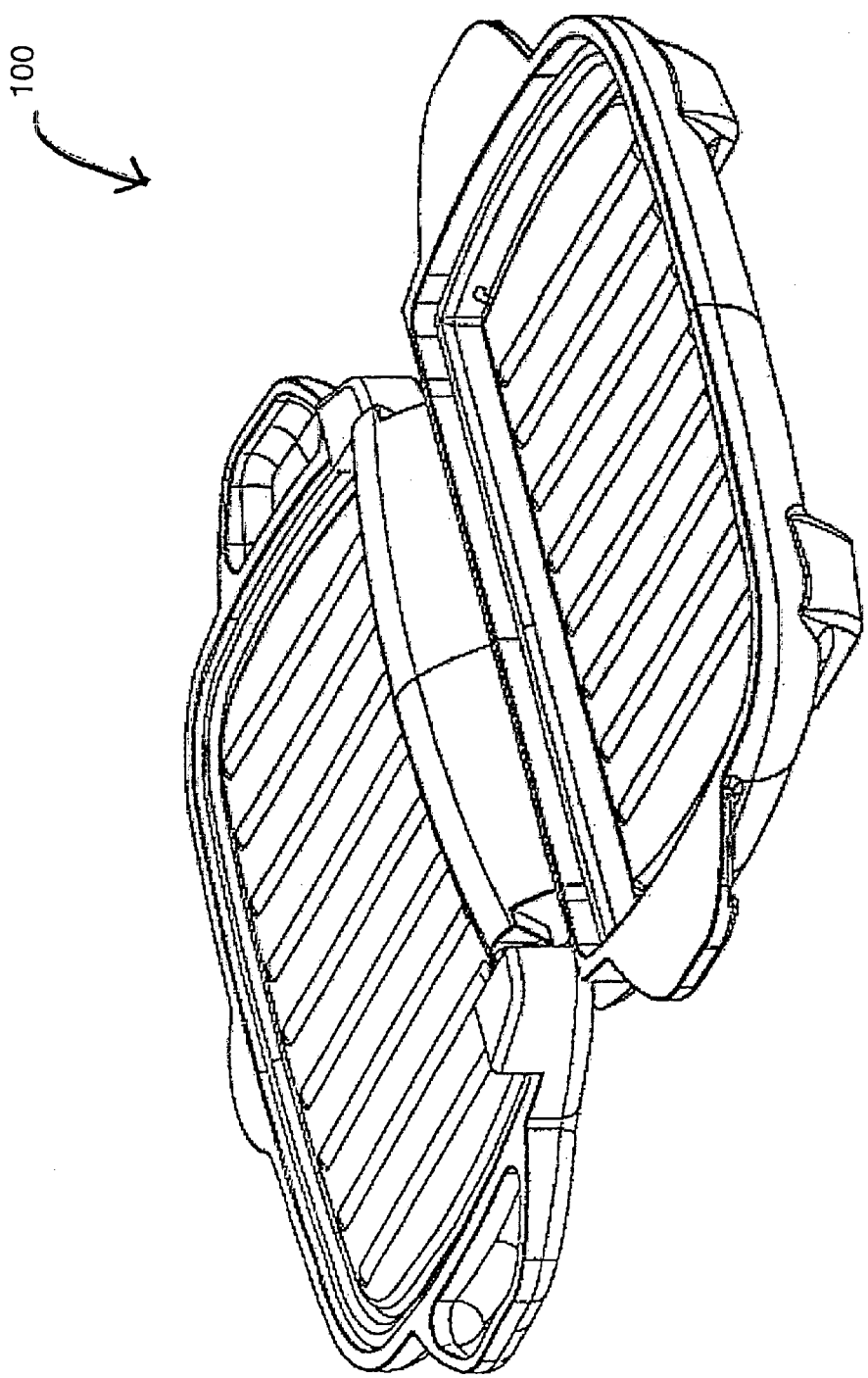
FIG. 3 is an illustration of the microwave grilling appliance with the microwave transparent cover at the 180 degree stop position.

Directing attention to FIG. 3, the opened position of the microwave transparent cover 102 in FIG. 3 depicts a second stop position of the microwave transparent cover 102, which is 180 degrees with respect to the microwave transparent base 104. FIG. 4 depicts an exploded illustration of the microwave grilling appliance 100. The first lip 406 is located around the perimeter of the first grill element 202 and the second lip 404 located within the inside perimeter of the microwave transparent base 104. A first rim 402 is located on the underside of the first grill element 202. A second rim 412 is located on the top side of the second grill element 204, when the microwave transparent cover 102 is oriented in the closed or cooking position. The third lip 408 is located around the perimeter of the second grill element 204, and the fourth lip 410 is located within the inside perimeter of the microwave transparent cover 102.

Directing attention to FIGS. 5 and 6, cross-sections of the first grill element 202 and the second grill element 204, respectively, are shown. The first grill element 202 includes a first microwave absorbent material 604 and the second grill element 204 includes a second microwave absorbent material 504. The microwave absorbent materials 604 and 504 comprise a ferrite mixture of resin and a metal oxide. Preferably, the resin amount is at least 15 percent, or alternatively, an amount greater than 15 percent, such as 20 percent. The metal oxide comprises a ferrite compound, such as Powder Tech FP350. The first microwave absorbent material 604 is located in a recess 615 defined by the first rim 402 of the first grill element 202. The second microwave absorbent material 504 is located in a recess 515 defined by the second rim 412.

The first grill element 202 is supported in the microwave transparent base 104 by the lip 406, thereby creating a void space between the first grill element 202 and the microwave transparent base 104 to separate the first microwave absorbent material 604 from the microwave transparent base 104 when the first microwave absorbent material 604 is heated by the microwaves. The second grill element 204 is supported in the microwave transparent cover 102 by lip 408 thereby creating a void space between the second grill element 204 and the microwave transparent cover 102 to separate the second microwave absorbent material 504 from the microwave transparent cover 102 when the second microwave absorbent material 504 is heated by the microwaves. It is a feature of the invention that the grill elements 202, 204 contact the cover 102 and base 104, respectively, only in the region where the lips 406 and 404 and 408 and 410, respectively, overlap. The lips 406, 408 are spaced from the hottest portion of the grill elements 202, 204, respectively, and comprise only a small area; thus, the heat transfer between the grill elements 202, 204 and the base 104 and cover 102 is minimized.

The first grill element 202 includes a first heat conducting element 606 and the second grill element 204 includes a second heat conducting element 506. The ferrite mixture of resin and metal oxide is mixed, poured and cured on the backside of the stamping of heat conducting elements 506, 606. The heat conducting elements 506, 606 comprise a metal, such as stamped aluminum. In one aspect of the present invention, the stamped aluminum is approximately 0.090 inches in thickness. The first heat conducting element 606 includes a first surface 610 and a second surface 608. The surfaces are defined by the large planar surfaces of the first heat conducting element 606. The first surface 610 contacts the first microwave absorbent material 604. The second surface 608 contacts the grillable food and is covered with a non-stick coating, such as Teflon™. The second heat conducting element 506 includes a third surface 508 and a fourth surface 510, which are again defined as the large planar surfaces of the second heat conducting element 506. The third surface 508 contacts the second microwave absorbent material 504. The fourth surface 510 contacts the grillable food and is covered with a non-stick coating, such as Teflon™.

The first grill element 202 has a first trough 602 that is located around the perimeter of the first grill element 202. The first trough 602 is continuous and runs the entire perimeter of the first grill element 202. The first trough 602 is formed into the first heat conducting element 606 to capture liquids that run from the grillable food. For the microwave transparent base 104, the first trough 602 protrudes downward to retain the liquids that run from the grillable food. In one aspect of the present invention, the first trough 602 is approximately 5.3 millimeters deep.

The second grill element 204 has a second trough 502 that is located around the perimeter of the second grill element 204. For the microwave transparent cover 102, the second trough 502 protrudes upward when the microwave transparent cover 102 is in the closed or cooking position. The orientation of FIG. 5 is that of the microwave transparent cover being opened a full 180 degrees relative to the microwave transparent base 104. In one aspect of the present invention, the second trough 502 is approximately 4 millimeters in depth. When the microwave grilling appliance 100 is opened completely 180 degrees, so that grill elements 204, 202 of the microwave transparent cover 102 and the microwave transparent base 104 point upward, the respective troughs 502, 602 are located downward into the heat conducting elements 506, 606. The trough area produces rims 402, 412 on the opposite side of the heat conducting elements 606, 506 respectively, that defines the area where the microwave absorbent material is attached to the heat conducting element. The rims 402, 412 are located on the opposite side of their respective heat conducting elements 606, 506 that contacts the grillable food.

It is a feature of the invention that the troughs 602, 502 are sufficiently large so as to contain any amount of liquid that can be reasonably generated by the food being grilled. Thus, liquid overflow, which can both cause messes and can test the seals, is substantially eliminated by the invention. Preferably, trough 602 has a capacity of between 20 mls and 50 mls, and the trough 502 has a capacity of between 10 mls and 30 mls. More preferably, trough 602 has a capacity between 25 mls and 40 mls, and the trough 502 has a capacity of between 15 mls and 25 mls. An important difference between the invention and the prior art is that trough 602 has a capacity of 20 mls or greater, and more preferably, 25 mls or greater, and most preferably, 30 mls or greater.

The second surface 608 and the fourth surface 510 have ribs 206 for added searing effect and to allow liquids to run to one or both of the troughs 502, 602. In one aspect of the present invention, there are nine ribs 206 formed in the second grill element 204, and there are eight ribs 206 formed in the first grill element 202. The ribs 206 protrude outwardly from the heat conductive elements 506, 606 toward the surface of the grillable food.

Figure 7:
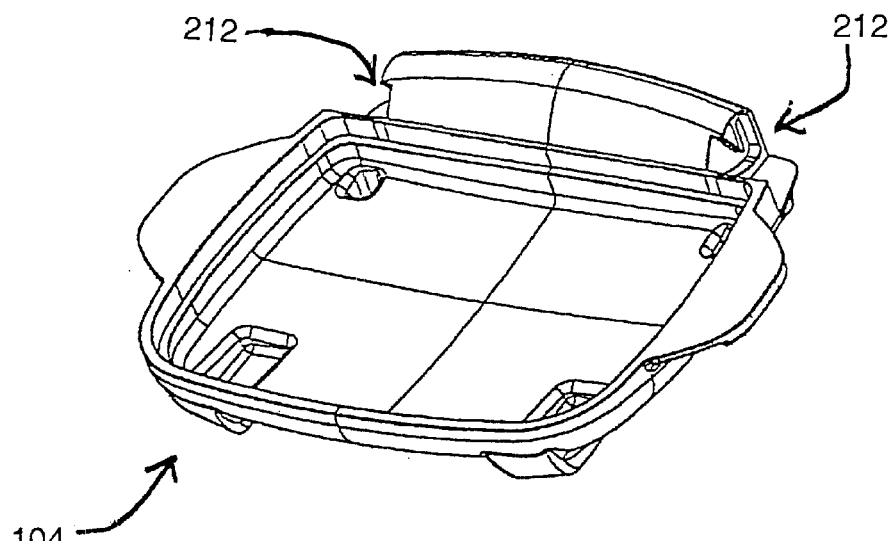
FIG. 7 is an illustration of the of the hinge assembly located in the microwave transparent base without the pins.
Figure 8:
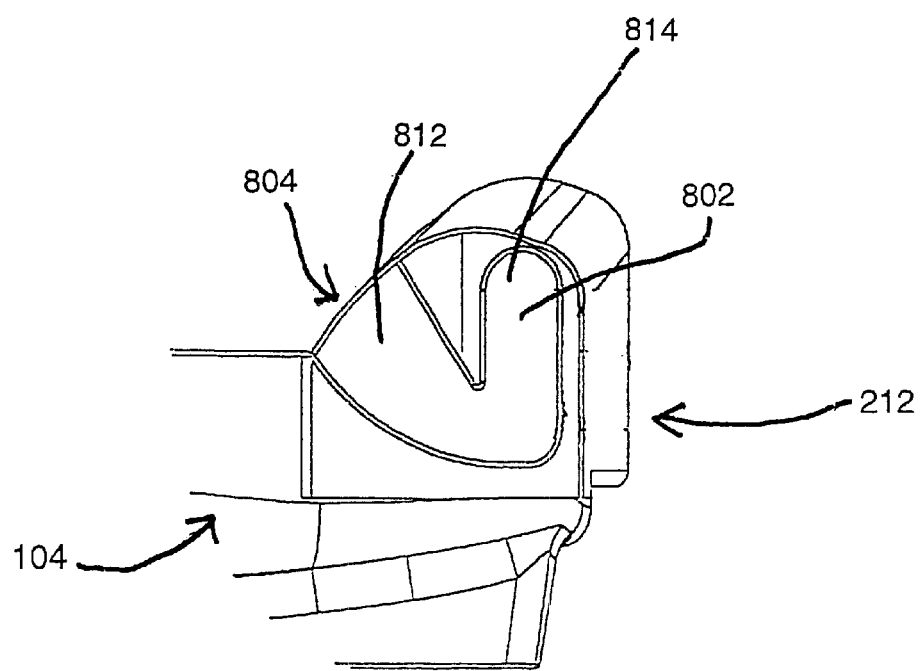
FIG. 8 is an end view of the hinge assembly.
Figure 9:
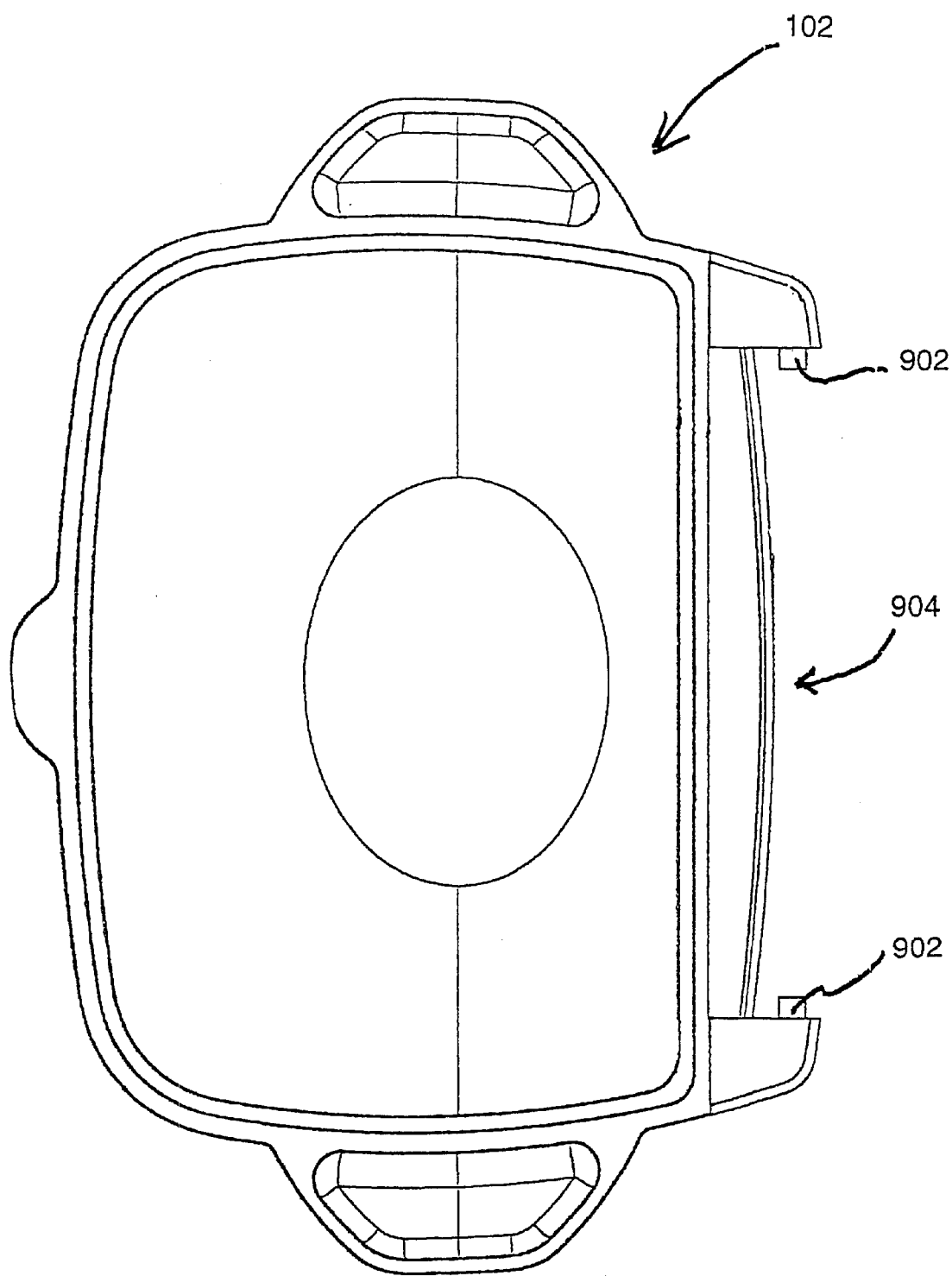
FIG. 9 is an illustration of microwave transparent cover showing the pin assembly.

Directing attention to FIGS. 7 and 8, the microwave grilling appliance 100 includes a hinge assembly 212. The hinge assembly 212 includes two channels 802 formed into the microwave transparent base 104. Both channels 802 are located toward the rear of the microwave grilling appliance 100. The channels 802 face outwardly from each other and have a rounded bottom portion. Each channel accepts a pin 902 that is attached to the microwave transparent cover 102. The microwave transparent cover 102 includes two pins 902 which point inwardly toward each other. One pin 902 is on each side of the microwave transparent cover 102, and the two pins 902 are located toward the rearward portion of the microwave transparent cover 102. The microwave transparent cover 102 attaches to the microwave transparent base 104 by sliding the two pins 902 into the two channels 802 in the direction of opening 804. When the pins 902 are engaged in the channels and the microwave transparent cover 102 is rotated toward the opened position, as shown in FIG. 3, the pins 902 tend to slide forward into the portions 812 of channels 802 and engage the sides of the walls of the channels 802 permitting a rearward portion 904 of the microwave transparent cover 102 to stop against a slight bulging rearward portion 414 of the microwave transparent base 104 to define a stop position just past 90 degrees. The microwave transparent cover 102 can be moved beyond this stop position by lifting the microwave transparent cover 102 slightly off of the microwave transparent base 104, with pin 902 remaining in channel portion 814, and positioning the microwave transparent cover 102 in the 180 degree position, relative to the microwave transparent base 104. This action defines another stop position.

In addition, the hinge assembly 212 allows vertical movement of the microwave transparent cover 102 relative to the microwave transparent base 104, by pins 902 moving upward into portions 814 of channels 802 to enable the microwave transparent cover 102 to be opened relative to the microwave transparent base 104 while remaining relatively parallel to the microwave transparent base 104. This enables the microwave grilling appliance 100 to grill grillable foods of differing thicknesses. A channel opening 804 allows the microwave transparent cover 102 to be removed from the microwave transparent base 104.

EXAMPLE 1

Medium Rare Steak

A microwave grilling appliance 100 includes a microwave transparent base 104 comprising a bulk molded plastic that is approximately 11 inches wide and 7.6 inches deep. The microwave transparent base 104 has two channels 802 located in the rearward portion of the microwave transparent base 104 that comprises part of the hinge apparatus 212. A microwave transparent cover 102 comprising a bulk molded plastic includes two inwardly facing pins 902 that fit into the channels 802 of the microwave transparent base 104 to complete the hinge apparatus 212. The microwave transparent base 104 includes a first lip 406 that accepts an epoxy glue. A first grill element 202 comprising a first heat conducting element 606 and a first microwave absorbent material 604 and a second lip 404 contacts the top of the epoxy glue and first lip 406 to create a first liquid-tight seal 208. The first heat conducting element 606 is aluminum and is 0.090 inches in thickness. The first microwave absorbent material 604 comprises a mixture of 80 percent of Power Tech FP 350 and 20 percent resin. The microwave transparent cover 102 includes a third lip 408 that accepts an epoxy glue. A second grill element comprising a second heat conducting element 506 and a second microwave absorbent material 504 and a fourth lip 410 contacts the top of the epoxy glue and third lip 408 to create a second liquid-tight seal 210. The microwave grilling appliance 100 is inserted and placed upside down into a conventional microwave oven equipped with a 1000 watt magnetron. The microwave grilling appliance is preheated for five minutes. The microwave grilling appliance 100 is removed from the microwave oven and opened. A steak of 1 inch thickness is placed in the microwave grilling appliance 100 and the microwave transparent cover 102 is closed on top of the steak. The microwave grilling appliance 100 is placed back in the microwave oven, right side up, and cooked for 2.5 minutes for a medium rare steak. The steak was cooked to medium rare with grill marks on both sides of the steak.

EXAMPLE 2

Chicken

A microwave grilling appliance 100 as constructed in Example 1 above is placed in a conventional microwave and preheated for 5 minutes as in Example 1. The microwave grilling appliance 100 is then removed and opened and a boneless chicken breast is placed in the microwave grilling appliance 100 and the microwave transparent cover 102 is closed on top of the chicken breast. The microwave grilling appliance 100 is placed back in the conventional microwave, right side up, and cooked for 5 minutes. The chicken breast was fully cooked with grill marks on both sides.

EXAMPLE 3

Grilled Sandwich

A microwave grilling appliance 100 as constructed in Example 1 above is placed in a conventional microwave and preheated for 5 minutes as in Example 1. The microwave grilling appliance 100 is then removed and opened and a sandwich is placed in the microwave grilling appliance 100 and the microwave transparent cover 102 is closed on top of the sandwich. The microwave grilling appliance 100 is placed back in the conventional microwave, right side up, and cooked for 3 minutes. The sandwich was fully cooked with grill marks on both sides.

There has been described a microwave grilling appliance that is much easier to use and much more reliable than prior art microwave grilling appliances. It should be understood that the particular embodiments shown in the drawings and described within this specification are for purposes of example and should not be construed to limit the invention, which will be described in the claims below. Further, it is evident that those skilled in the art may now make numerous uses and modifications of the specific embodiments described, without departing from the inventive concepts. Consequently, the invention is to be construed as embracing each and every novel feature and novel combination of features present in and/or possessed by the invention herein described.

What is claimed is:

1. An appliance for converting microwave energy to heat and applying said heat to a grillable food or other grillable substance, said appliance comprising:
    a first grill element including a microwave absorbent material and a heat conducting element, said heat conducting element having a first surface in contact with said microwave absorbent material and a second surface adapted to contact said grillable food or other grillable substance;
    a microwave transparent base adapted to support said grill element with said absorbent material spaced from said base, said base and heat conducting element enclosing said absorbent element; and
    a liquid-tight seal between said grill element and said base.

2. An appliance as in claim 1 wherein said seal comprises an epoxy glue.

3. An appliance as in claim 2 wherein said epoxy is a flexible epoxy.

4. An appliance as in claim 3 wherein said epoxy is a silicon-based epoxy.

5. An appliance as in claim 2 wherein said seal further comprises a first lip on said heat conducting element and a second lip on said base, said first and second lips overlapping, and wherein epoxy glue is located between said lips.

6. An appliance as in claim 5 wherein said first lip is spaced from said microwave absorbent material.

7. An appliance as in claim 5 wherein said heat conducting element includes a first trough between said first lip and said second surface, said first trough having sufficient capacity to effectively prevent grease and liquids generated in the grill process from overflowing the grill unit.

8. An appliance as in claim 7 wherein said first trough has a capacity of between 20 milliliters (mls) and 45 mls.

9. An appliance as in claim 7 wherein said first trough forms a rim about said first surface, and wherein said microwave absorbent material lies in the recess formed by said rim.

10. An appliance as in claim 1, and further including:
    a second grill element including a second microwave absorbent material and a second heat conducting element, said second heat conducting element having a third surface in contact with said microwave absorbent material and a fourth surface adapted to contact said grillable food or other grillable substance;
    a microwave transparent cover adapted to support said grill element, said cover and said second heat conducting element enclosing said second absorbent material; and
    a second liquid-tight seal between said second grill element and said cover.

11. An appliance as in claim 10 wherein said second seal comprises a third lip on said second heat conducting element and a fourth lip on said cover, said third and fourth lips overlapping, and wherein epoxy glue is located between said third and fourth lips.

12. An appliance as in claim 11 wherein said third lip is spaced from said second microwave absorbent material.

13. An appliance as in claim 11 wherein said heat conducting element includes a second trough between said third lip and said third surface, said trough having sufficient capacity to effectively prevent grease and liquids generated in the grill process from overflowing the grill unit.

14. An appliance as in claim 13 wherein said trough has a capacity of greater than 25 mls.

15. An appliance for converting microwave energy to heat and applying said heat to a grillable food or other grillable substance, said appliance comprising:
    a first grill element including a first microwave absorbent material and a first heat conducting element, said first heat conducting element having a first surface in contact with said microwave absorbent material and a second surface adapted to contact said grillable food or other grillable substance;
    a microwave transparent base adapted to support said grill element, said base and first heat conducting element enclosing said first absorbent element;
    a second grill element including a second microwave absorbent material and a second heat conducting element, said second heat conducting element having a third surface in contact with said microwave absorbent material and a fourth surface adapted to contact said grillable food or other grillable substance;
    a microwave transparent cover adapted to support said grill element, said cover and said second heat conducting element enclosing said second absorbent element; and
    a hinge assembly adapted to: permit movement of said fourth surface relative to said second surface with said fourth and second surfaces remaining substantially parallel; permit rotational movement of said cover about said hinge; and support said cover in first stop position located at a point corresponding to a rotation about said hinge of between 90 degrees and 180 degrees.

16. An appliance as in claim 15 wherein said hinge assembly is further adapted to permit said cover to lie flat on a flat surface at a second stop position located at a position corresponding substantially to a rotation about said hinge of 180 degrees.

17. A method of manufacturing an appliance for converting microwave energy to heat and applying said heat to a grillable food or other grillable substance, said method comprising:

providing a first grill element including a microwave absorbent material and a heat conducting element, said heat conducting element having a first surface in contact with said microwave absorbent material and a second surface adapted to contact said grillable food or other grillable substance;

forming a first lip on said heat conducting element;

providing a microwave transparent base adapted to support said grill element with said absorbent material spaced from said base, said base and heat conducting element enclosing said absorbent material;

forming a second lip on said base;

applying an epoxy glue between said first and second lips;

placing said grill element in said base so that no portion of said microwave absorbent material contacts said base; and forming a liquid-tight seal between said grill element and said base.

18. A method as in claim 17, further including:

providing a second grill element including a second microwave absorbent material and a second heat conducting element; said second heat conducting element having a third surface in contact with said microwave absorbent material and a fourth surface adapted to contact said grillable food or other grillable substance;

forming a third lip on said second grill element;

providing a microwave transparent cover adapted to support said grill element, said cover and said second heat conducting element enclosing said second absorbent element;

forming a fourth lip on said microwave transparent cover;

applying an epoxy glue between said third and fourth lips;

placing said second grill element in said cover so that no portion of said microwave absorbent material contacts said cover; and forming a liquid-tight seal between said second grill element and said cover.

* * * * *